United States Patent [19]

Fisli

[11] 4,241,990
[45] Dec. 30, 1980

[54] MULTI-PURPOSE OPTICAL DATA PROCESSOR

[75] Inventor: Tibor Fisli, Los Altos Hills, Calif.

[73] Assignee: Xerox Corporation, Stamford, Conn.

[21] Appl. No.: 17,783

[22] Filed: Mar. 5, 1979

[51] Int. Cl.³ ............................................. G03G 15/00
[52] U.S. Cl. ............................................ 355/11; 355/8; 355/66; 358/300
[58] Field of Search ...................... 355/3 R, 11, 8, 66; 358/300, 285, 286

[56] References Cited

U.S. PATENT DOCUMENTS

| 4,027,961 | 6/1977 | Starkweather | 358/300 X |
| 4,046,471 | 9/1977 | Branham et al. | 358/300 X |
| 4,122,462 | 10/1978 | Hirayama et al. | 358/300 X |

*Primary Examiner*—R. L. Moses

[57] ABSTRACT

A multi-purpose optical data processor has shared optics for selective performing light/lens xerographic copying in accordance with a line-by-line scanning pattern and laser reading and writing in accordance with a raster scanning pattern. Among the laser reading and writing functions which such an optical data processor can perform are laser input scanning and laser xerographic printing, and laser photographic and thermographic recording.

21 Claims, 8 Drawing Figures

FIG_4

FIG_6

FIG_7

MULTI-PURPOSE OPTICAL DATA PROCESSOR

BACKGROUND OF THE INVENTION

This invention relates to multi-purpose optical data processors and, more particularly, to optical data processors having shared optics for selectively performing light/lens xerographic copying and one or more laser scanning functions, such as laser input scanning, laser xerographic printing, and laser photographic, thermographic and luminescent recording.

Dedicated light/lens xerographic copiers, laser input scanners, and laser xerographic, photographic and thermographic printers are available in the prior art. Those units have been developed for a variety of diverse optical data processing applications; including, for example, photocopying in the case of the light/lens copiers, facsimile input scanning and video data processing in the case of the raster input scanners, and facsimile and computer output printing in the case of the laser printers.

Laser scanners have been provided for selectively performing laser reading and writing functions. Indeed, the Telecopier 200 fascimile transceiver, which is manufactured and sold by Xerox Corporation, has shared optics which are selectively utilized to perform laser input scanning when the transceiver is operating in a transmit mode and laser xerographic printing when the transceiver is operating in a receive mode.

Heretofore, however, shared optics have not been employed to any substantial extent in multi-purpose optical data processors which rely on slit scanning for light/lens xerograhic copying and raster scanning for laser reading and writing. The economic and packaging advantages of providing shared optics for such a processor are clear. Thus, a likely explanation for the absence of a relevant teaching in the known prior art is that no one has previously found shared optics which can accommodate the diverse optical requirements imposed by the dissimilar scanning patterns.

SUMMARY OF THE INVENTION

In accordance with the present invention, shared optics are provided for multi-purpose optical data processors which employ a slit scanning pattern for light/lens xerographic copying and a raster scanning pattern for laser scanning. To that end, in the illustrated embodiments a laser, a laser modulator, and a beam scanning mechanism are combined with a more or less conventional copier having constant conjugate scan optics and a half lens in serial optical alignment between a transparent platen and a xerograhic photoreceptor. In keeping with this invention, a small optical aperture is formed through the otherwise reflective rear surface of the half lens to provide a path for the beam scanning mechanism to project a cylically sweeping unmodulated laser beam toward the platen for laser input scanning or a cyclically sweeping modulated laser beam toward the photoreceptor for laser xerograhic printing. Indeed, in one embodiment, the cyclically sweeping modulated laser beam may also be selectively directed toward the platen for laser photograhic, thermograhic or luminescent recording. The presence of the aperture does not materially degrade the light/lens xerographic copying performance of the processor because the laser is extinguished while light/lens copying is being carried out and the area of the aperture is essentially negligible in comparison to the area of the reflective rear surface of the half lens. However, substantial synergism is achieved. For example, the half lens performs double pass imaging for light/lens copying and single pass imaging for laser reading and writing. Moreover, the conventional cross scan motion of the scan optics and of the photoreceptor not only create a slit scanning pattern for light/lens copying, but also contribute cross scan components of motion to raster scanning patterns for laser reading and writing.

BRIEF DESCRIPTION OF THE DRAWINGS

Still further objects and advantages of the invention will become apparent when the following detailed description is read in conjunction with the attached drawings, in which.

DETAILED DESCRIPTION OF THE ILLUSTRATED EMBODIMENTS

While the invention is described in detail hereinafter with specific reference to certain illustrated embodiments, it is to be understood that there is no intent to limit it to those embodiments. On the contrary, the intent is to cover all modifications, alternatives and equivalents falling within the spirit and scope of the invention as defined by the appended claims.

Figure 1:
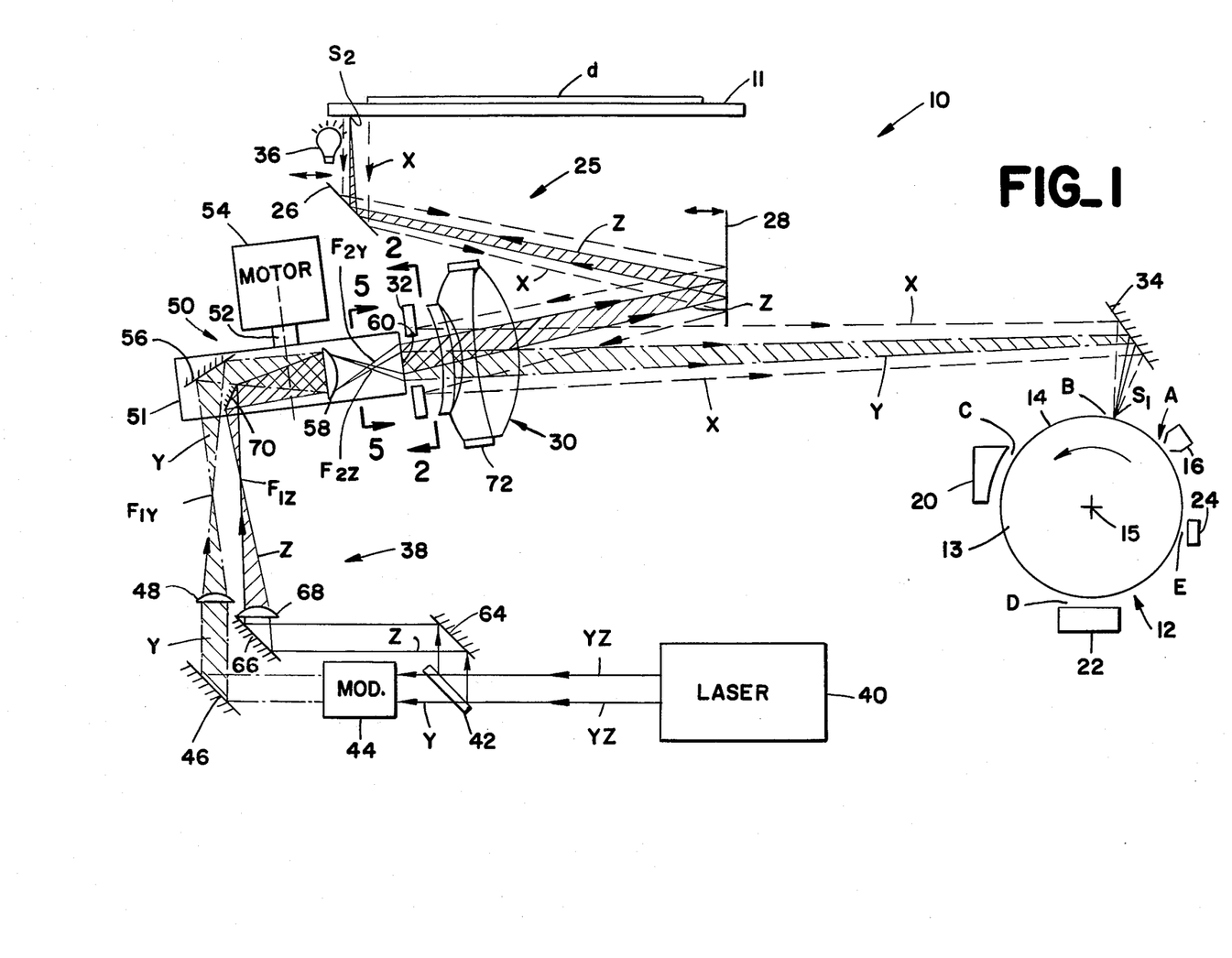
FIG. 1 is a schematic diagram of a multi-purpose optical data processor constructed in accordance with the present invention.

Turning now to the drawings, and at this point especially to FIG. 1, it will be seen that there is a multi-purpose optical data processor 10 for selectively performing light/lens xerographic copying, laser input scanning, and laser xerographic printing. As shown, the processor 10 is based on the commerically available 3100 copier of Xerox Corporation. It has been found that the optics of the 3100 copier may be readily modified to serve as shared optics for the multi-purpose processor 10.

Figure 2:
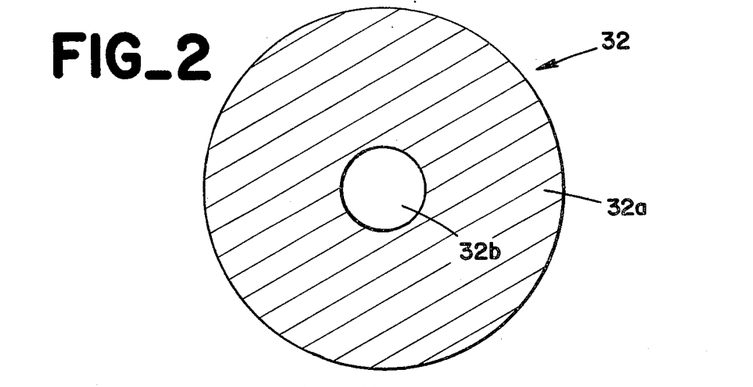
FIG. 2 is an enlarged sectional view, taken along the line 2—2 in FIG. 1 looking in the direction of the arrows, to illustrate the apertured rear mirror of the half lens in additional detail.

In keeping with the standard configuration of the 3100 copier, the processor 10 includes constant scan optics 25, a half lens 30, and a fixed mirror 34 in serial optical alignment between a transparent platen 11 and an exposure station B of a xerographic printer 12. As best shown in FIG. 2 a small, more or less centrally located optical aperture 32 b is formed through the rear mirror 32 of the half lens 30 to accommodate the laser reading and writing modes of operation of the processor 10. Otherwise, however, generally conventional 3100 copier optics may be used. As discussed in more detail hereinbelow, the area of the aperture 32 b is essentially negligible in comparison to the area of the reflective surfaces 32 a of the half lens rear mirror 32.

Focusing for a moment on the xerograhic printer 12, there is a drum 13 which has a photoconductive surface coating 14—sometimes referred to herein as a photoreceptor. The drum 13 is mounted for rotation on a longitudinal axis 15 and is driven during operation at a substantially constant rate in the direction of the arrow (i.e., a cross scan direction) by a motor (not shown) so that the photoreceptor 14 sequentially advances through a charging station A, the exposure station B, a development station C, a transfer station D, and a cleaning station E.

The xerograhic unit 12 carries out a more or less conventional xerographic printing process. More particularly, there is a corona generator 16 at the charging station A for initially depositing a generally uniform electrostatic charge on the surface of the photoreceptor 14. At the exposure station B, the photoreceptor 14 is exposed to an image dependent pattern of light and is, therefore, selectively discharged in an image configuration to form a latent electrostatic image. Toner is applied to the photoreceptor 14 by a development system 20 at the development station C to tone or develop the electrostatic image, and a transfer mechanism 22 at the transfer station D then transfers the toner image from the photoreceptor 14 to a suitable substrate, such as plain paper (not shown). The photoreceptor 14 continues to advance to and through the cleaning station E where residual toner is removed by a cleaning system 24. The image bearing substrate, on the other hand, is output from the processor 10 through a fuser (not shown) which more or less permanently bonds the toner image to the substrate.

Returning to the shared optics of the optical data processor 10, it will be seen that the constant conjugate scan optics 25 comprise a full rate scan mirror 26 and a half rate scan mirror 28 which are serially aligned between the platen 11 and the half lens 30. The scan mirrors 26 and 28 are elongated in a line scanning direction to extend across essentially the full width of the platen 11. Similarly, the fixed mirror 34 is optically aligned between the half lens 30 and the xerographic exposure station B and is elongated in the line scanning direction to extend across substantially the full width of the photoreceptor 14.

The optical data processor 10 functions like a Xerox 3100 copier when performing light/lens xerograhic copying. The subject to be copied, such as an original document d, is placed image side down on the platen 11 in position to be illuminated by a suitable light source 36, which is mounted (by means not shown) for movement with the full rate scan mirror 26. The scan mirrors 26 and 28 are synchronously reciprocated lengthwise of the platen 11 or, in other words, in the cross scan direction, so that the half lens 30 sequentially images successive full width segments of the subject d onto the photoreceptor 14 in accordance with a slit scanning pattern as the photoreceptor 14 advances through the exposure station B. The forward stroke velocities of the scan mirrors 26 and 28 are selected to ensure that the latent image formed on the photoreceptor 14 is a faithful replica of the image carried by the original subject d. To that end, the velocity at which the full rate scan mirror 26 is moved during its forward stroke (from left to right as shown) is selected to equal the surface speed of the photoreceptor 14, and the velocity at which the half rate scan mirror 28 is moved during its forward stroke (also from left as shown) is selected to equal one half the surface speed of the photoreceptor 14. Consequently, a substantially constant optical path length or conjugate distance is maintained between the platen 11 and the half lens 30 while successive segments of the subject d are being imaged onto the photoreceptor 14.

As indicated by the light rays X, the half lens 30 performs double pass imaging during light/lens copying. Light reflected from the subject d is serially reflected by the scan mirrors 26 and 28 and is then collected by the half lens 30. Some of that light escapes through the optical aperture 32 b (FIG. 2) in the rear mirror 32 of the halflens 30, but ample light for exposing the photoreceptor 14 is reflected by the reflective rear mirror surface 32 a (FIG. 2). As will be appreciated, the half lens 30 images the light reflected by the reflective surface 32 a of the rear mirror 32 onto the photoreceptor 14 via the fixed mirror 34.

In accordance with the present invention, the optical data processor 10 is also equipped to selectively carry out laser reading and writing. For that purpose, the illustrated optical processor 10 further includes a laser 40, a beam modulator 44, and a beam scanning mechanism 50. In keeping with one of the important objects of this invention, a multipurpose capability is built into the processor 10, without materially degrading its performance in any one of its operating modes. To aid in achieving that goal, potential sources of spurious light are eliminated by extinguishing the scan lamp 36 and the laser 40 during laser scanning and light/lens copying, respectively.

To perform laser reading or writing, the laser 40 is energized to supply a collimated light beam YZ. A beam splitter 42 is optically aligned with the laser 40 to divide the laser output beam YZ into two spaced apart secondary beams Y and Z of generally equal cross sectional area and power. One of those beams Y is transmitted through the beam splitter 42 to the modulator 44, while the other beam Z is reflected from the beam splitter 42 to a fixed minor 64.

More particularly, to carry out laser xerographic printing, the modulator 44 is driven by a serial video data stream (supplied by means not shown) to intensity modulate the laser beam Y. A fixed mirror 46 is optically aligned with the output of the modulator 44 to reflect the intensity modulated beam Y to a singlet lens 48. The lens 48 brings the modulated beam Y to a focus at a point $F_{1y}$ and projects it beyond that point to another fixed mirror 56. The mirror 56 reflects the intensity modulated beam Y to a second singlet lens 58 which refocuses the beam Y at a point $F_{2y}$ and projects it beyond that point in a projection plane selected to cause the beam scanning mechanism 12 to scan the intensity modulated beam Y across the photoreceptor 14 as it advances through the exposure station B of the xerograhic unit 12. Similarly, to carry out laser input scanning, the other laser beam Z is reflected from the mirror 64 to a second fixed mirror 66, thereby bypassing the modulator 44. The mirror 66 reflects the unmodulated beam Z to another singlet lens 68, which brings the beam Z to a focus at a point $F_{1z}$ and projects it beyond that point to still another fixed mirror 70. The unmodulated beam Z is reflected from the mirror 70 to the singlet lens 58 which, in turn, refocuses the unmodulated beam Z at a point $F_{2z}$ and projects it beyond that point to the beam scanning mechanism 12 with an angle of incidence which causes the beam scanning mechanism 12 to scan the unmodulated beam Z across the platen 11 via the scan optics 25.

Figure 3:
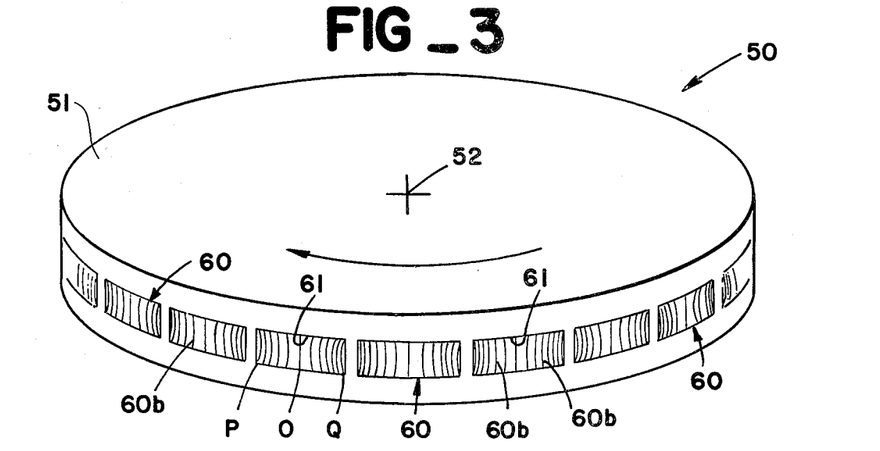
FIG. 3 is an enlarged perspective view of a multifacted holographic beam scanning mechanism which is suitable for use in optical data processors embodying this invention.

Referring to FIGS. 1 and 3, the beam scanning mechanism 50 suitably comprises a drum shaped scan head 51 having a plurality of essentially identical holographic diffraction gratings or facets 60 which are mounted in registration with individual apertures 61 at regular intervals about the circumferential periphery of the scan head 51. The scan head 51 is mounted on an output shaft 52 of a motor 54 to be driven during operation at a substantially constant rate in the direction of the arrow (FIG. 3) so that the facets 60 serially rotate through the projection paths for the modulated and unmodulated laser beams Y and Z at a predetermined frequency. As shown, the fixed mirrors 56 and 70 and the lens 58 are conveniently stationarily mounted within the hollow interior of the scan head 51. Thus, the bottom of the scan head 51 is open to avoid any interference with the projection of the modulated and unmodulated beams Y and Z to the mirrors 56 and 70, respectively.

Concentrating for a moment on FIG. 3, it will be seen that each of the holographic facets 60 has a grating frequency which varies, as indicated at 60 b, circumferentially of the scan head 51 and symmetrically with respect to the center line O of the facet. More specifically the grating frequency of each facet 60 increases at substantially equal rates from the center line O of the facet toward its leading and trailing edges P and Q, respectively. The grating frequency gradient for each facet 60 is selected so that the first order diffraction components of the modulated and unmodulated laser beams Y and Z, respectively, are scanned through a predetermined scan angle $\theta$ (FIG. 4) in the line scanning direction as each of the facets 60 rotates through the projection paths for the beams Y and Z. However, it should be understood that the grating frequency gradient need not be linear. Instead, a non-linear frequency gradient may be used to assist in obtaining increased scan linearity as subsequently described. Indeed, the gratings of the holographic facets 60 preferably have essentially identical computer generated frequency gradients. Computer generated space frequency varient holographic diffraction gratings and laser scanners based thereon are described in substantial detail by Bryngdahl and Lee in U.S. Pat. No. 4,106,844, which issued Aug. 15, 1978 and which is hereby incorporated by reference. Nevertheless, it should be noted that the first order diffraction components of the modulated and unmodulated laser beams Y and Z (referred to herein for convenience simply as the modulated and unmodulated beams) are cyclically scanned through the aforementioned scan angle $\theta$ as the facets 60 serially rotate through the beam projection paths. The other diffraction orders of the laser beams Y and Z are blocked or stopped by the rear mirror 32 of the half lens 30 (FIG. 1) and, therefore, may be ignored.

Returning to FIG. 1, in keeping with the present invention, the beam scanning mechanism 50 is positioned behind the half lens 30, but as close to the rear mirror 32 thereof as ordinary manufacturing tolerances permit. Furthermore, the beam scanning mechanism 50 is aligned to project the cyclically scanning laser beams Y and Z through the optical aperture 32b (FIG. 2) via projection planes which are selected to cause the half lens 30 to image the beams Y and Z onto the photoreceptor 14 and the platen 11, respectively. Inasmuch as the laser beams Y and Z only make a single pass through the half lens 30, both beams preferably are reasonably well collimated while being applied to the half lens 30. For that reason, the f/numbers of the holographic facets 60 and the f/numbers of the modulated and unmodulated beams Y and Z projected from the focal points $F_{2y}$ and $F_{2z}$, respectively, are selected to be generally equal to one another.

A specific example may be helpful at this point. As will be recalled, the illustrated optical data processor 10 is based on the Xerox 3100 copier. Consequently, the projection planes for the modulated and unmodulated laser beams are ideally displaced from one another at the half lens 30 by approximately 5°18'. Furthermore, the conjugate distances from the half lens 30 to the platen 11 and from the half lens 30 to the photoreceptor 14 may each be taken as being about 15 inches long. Thus, to realize a scan line length of roughly 11 inches at both the platen 11 and the xerograhic exposure station, B, a scan angle $\theta$ (FIG. 4) of roughly 40° is required. Given the 5°18' angular separation between the projection planes for the modulated and unmodulated laser beams Y and Z and the 40° scan angle $\theta$, it can be shown that the optical aperture 32 b need have a diameter of only ⅛ inch or so. That represents slightly more than one percent of the surface area of the rear mirror for the half lens of a conventional 3100 copier. Accordingly, the area of the aperture 32 b is, as previously mentioned, essentially negligible in comparison to the area of the reflective surface 32 a (FIG. 2) of the half lens rear mirror 32. In the interest of completeness it is noted that if the laser 40 is a He Cd laser, a 40° scan angle $\theta$ can be achieved by selecting each of the holographic facets 60 to have a maximum grating frequency of approximately 774 lines/inch.

As will be appreciated, the photoreceptor 14 and the platen 11 are scanned by the modulated laser beam Y and by the unmodulated laser beam Z, respectively, in accordance with predetermined raster scanning patterns. The beam scanning mechanism 50 cyclically sweeps the laser beams Y and Z through the aforementioned scan angle $\theta$ in the line scanning direction to provide the line scanning components of motion for those scanning patterns. However, in accordance with an important feature of this invention, the cross scan components of motion for the raster scanning patterns are provided by the rotation of the photoreceptor 14 and by the reciprocating motion of the scan optics 25. To that end, the modulated beam Y is imaged onto the photoreceptor 14 via the fixed mirror 34 as the photoreceptor 14 advances through the exposure station B. The unmodulated beam Z, on the other hand, is imaged onto the platen 11 via the half rate scan mirror 28 and the full rate scan mirror 26 while the scan mirrors 26 and 28 are traversing the platen 11 on their forward strokes.

When a laser reading function is to be performed, a suitable subject, such as the original document d, is placed image side down on the platen 11 in position to be raster scanned by the unmodulated laser beam Z. Light reflected from the document d is picked up by the full rate scan mirror 26 and reflected to the half rate scan mirror 28 for further reflection toward the half lens 30. As shown, a ring-like photodetector 72 snugly surrounds the half lens 30 to convert the diffused component of the reflected light into a serial video electrical signal representing the information content of the document d. Ordinarily, there is sufficient diffusion of the reflected light to obtain an acceptable video response from the photodetector 72. Alternatively, however, the photodetector may be moved (by means not shown) into and out of the optical path of the processor 10—say, at a point between the half rate scan mirror 28 and the half lens 30—depending on whether laser input scanning is or is not being carried out.

Figure 4:
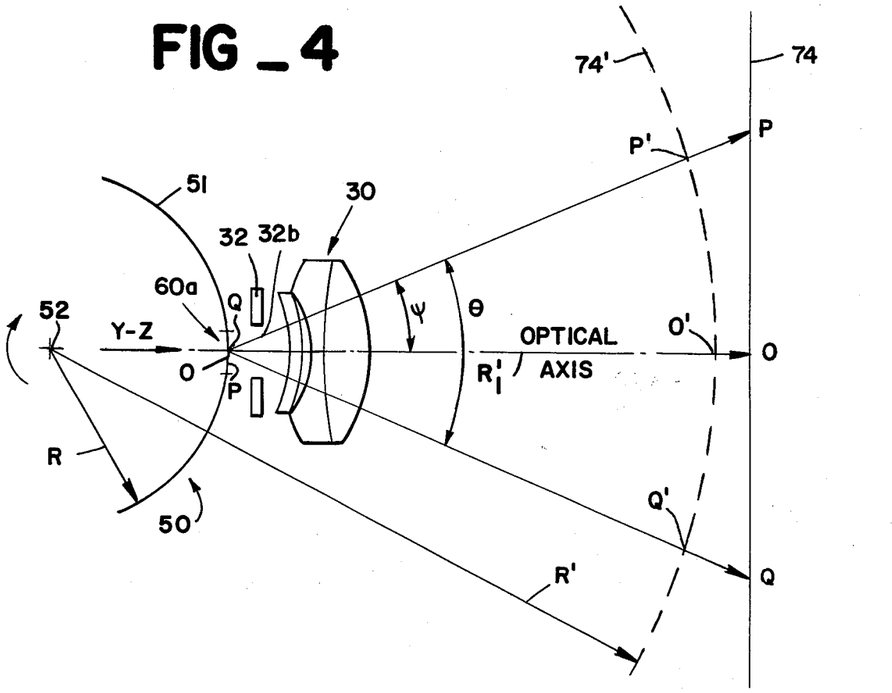
FIG. 4 is a simplified optical diagram illustrating the basic operation of the holographic beam scanning mechanism shown in FIG. 5 is an enlarged sectional view, taken along the line 5—5 in FIG. 1 looking in the direction of the arrows, to show the shaped aperture-type compensation which may be provided for each facet of the holographic beam scanning mechanism to achieve increased uniformity in the intensity of the laser scanning spots provided for laser reading and writing.

Referring to FIG. 4, it will be evident that the modulated and unmodulated laser beams Y and Z produce scanning spots $S_1$ and $S_2$ (FIG. 1.) which sweeps across essentially planar scan lines—collectively indicated at 74—on the photoreceptor 14 and the platen 11, respectively. Ideally, of course, the scanning spots $S_1$ and $S_2$ are dimensionally stable, free of spurious modulation components, and advance at a linear scan rate (i.e., as a linear function of the rotation of the scan head 51). Unfortunately, however, it is difficult to impart those characteristics to the scanning spots $S_1$ and $S_2$ because the optical path lengths for the laser beams Y and Z vary as a function of the rotation of the scan head 51.

Analyizing the optical path lengths for the laser beams Y and Z in some additional detail, it will be understood that the beam scanning mechanism 50 is constructed so that each of the holographic facets or diffraction gratings 60 is at a substantially constant radial distance R from the axis of rotation 52 of the scan head 51. Accordingly, if the curvature of the half lens 30 is ignored, the locus of points P'O'A' which are optically equidistant from the beam scanning mechanism 50 at any given distance R' therefrom (where R'>R) is defined by an arc, shown in dashed lines at 74', which is centered on the axis 52 and which has a substantially constant radius (R'+R). Hence, the variation Δ L in the optical path lengths for the modulated and unmodulated beams Y and Z as a function of the rotation of the scan head 51 is given by:

$$\Delta L = R'_1/(|\cos\psi|) - R'_1 \qquad (1)$$

where:

$R'_1$ = the radial distance from the scan head 51 to the midpoint of the scan line 74; and $\psi$ = the instantaneous angular displacement in the scanning direction of the modulated and unmodulated laser beams Y and Z relative to the optical axis of the half lens 30.

Figure 5:
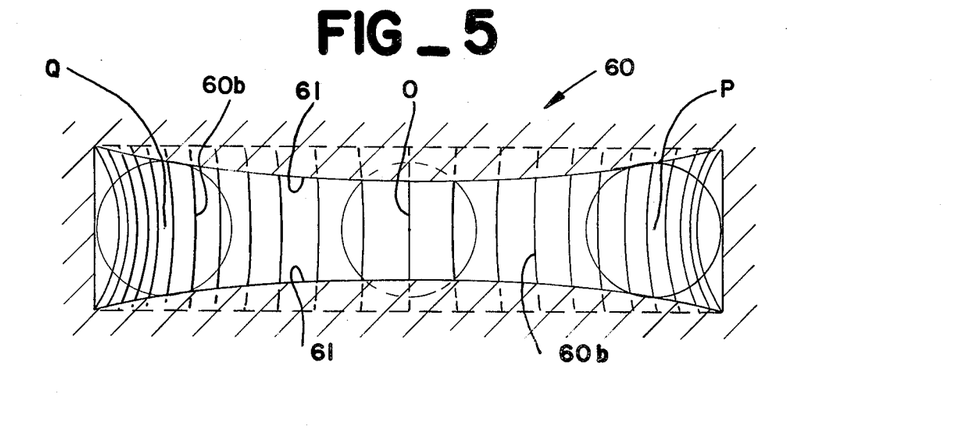

As shown in FIG. 5, in accordance with one of the more detailed aspects of the present invention, the apertures 61 for the holograhic facets 60 have a curvilinear contour to compensate for the tendency of the scanning spots $S_1$ to $S_2$ to vary in intensity (i.e., energy content) as a function of the rotation of the scan head 51 and other optical nonlinearities affecting power thoughout efficiency. Specifically, each of the apertures 61 is shaped so that the beams Y and Z are subjected to a degree of cross scan truncation which varies lengthwise of each of the facets 60 at a rate which is selected to provide scanning spots $S_1$ and $S_2$ of substantially constant intensity throughout the full scan angle $\theta$. In this instance, each of the aperture 61 has a butterfly shape so that the maximum amount of beam trancation occurs at the centerline 0 of each facet 60 and little, if any, truncation occurs at the leading and trailing edges P and A, respectively. As a general rule, excessive diffraction may be avoided with this cross scan truncation compensation technique. Alternatively, however, the transmission efficiency of each of the facets 60 may be varied or graded in the line scanning direction to provide the desired compensation.

Figure 6:
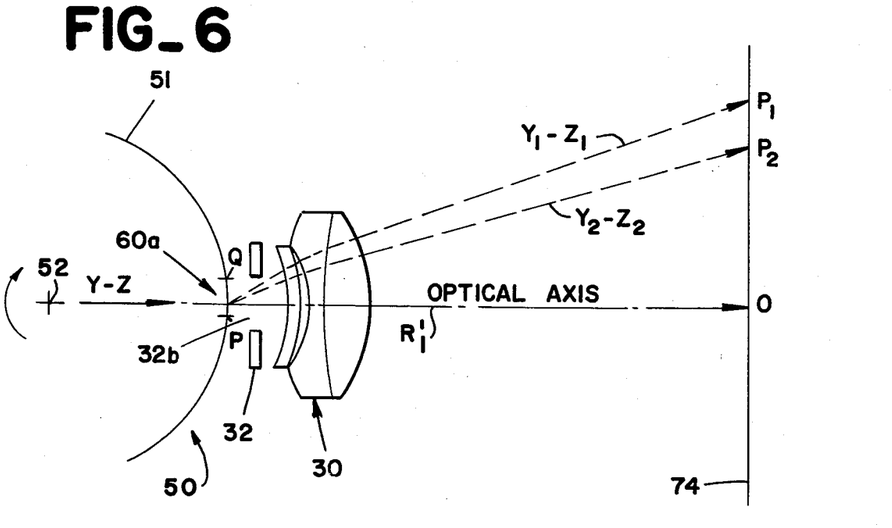
FIG. 6 is a more detailed optical diagram which is similar to FIG. 4, but which shows the scan linearizing and field flattening effects of the half lens as applied to laser reading and writing.

Turning to FIG. 6, in accordance with another of the detailed features of this invention, provision is made for achieving a linear scan of the scanning spots $S_1$ and $S_2$ despite the aforementioned optical path length variations. As a matter of definition, a linear scan requires that the scanning spots $S_1$ and $S_2$ advance a fixed distance along the scan lines 74 for each unit of rotation of the scan head 51.

The incremental movement of the scanning spots $S_1$ or $S_2$ per unit of rotation of the scan head 51 tends to nonlinearly increase as a function $f_1(\psi)$ of the angular displacement of the modulated and unmodulated laser beam Y and Z from the optical axis of the half lens 30. Fortunately, however, the curvature of the half lens 30 at least partially counteracts that tendency by nonlinearly increasing the refraction of the laser beams Y and Z as a function $f_2(\psi)$ of the displacement angle, (compare the refraction of the rays to points $P_1$ and $P_2$ on the scan line 74). Therefore, a substantially constant scan of the scanning spots $S_1$ and $S_2$ can be achieved by selecting the diffraction grating frequency gradient $f_3(\psi)$ for the holographic facets 60 so that:

$$f_3(\Psi) \cong \frac{k}{f_1(\Psi) \times f_2(\Psi)} \qquad (2)$$

where k = a constant

That may involve a complex computation, but is well within the capabilities of the aforementioned computer generated space frequency varient holographic diffraction grating calculation techniques.

As shown in FIGS. 3 and 6, field flattening is relatively easy to achieve because the focal length for any given segment of any one of the facets 60 depends on the shape of the grating line or lines 60b within that particular segment. Thus, the grating line shapes may be varied lengthwise of each of the facets 60 to cooperate with the half lens 30 in maintaining the scanning spots $S_1$ and $S_2$ substantially in focus along the entire length of each of the scan lines 74.

Figure 7:
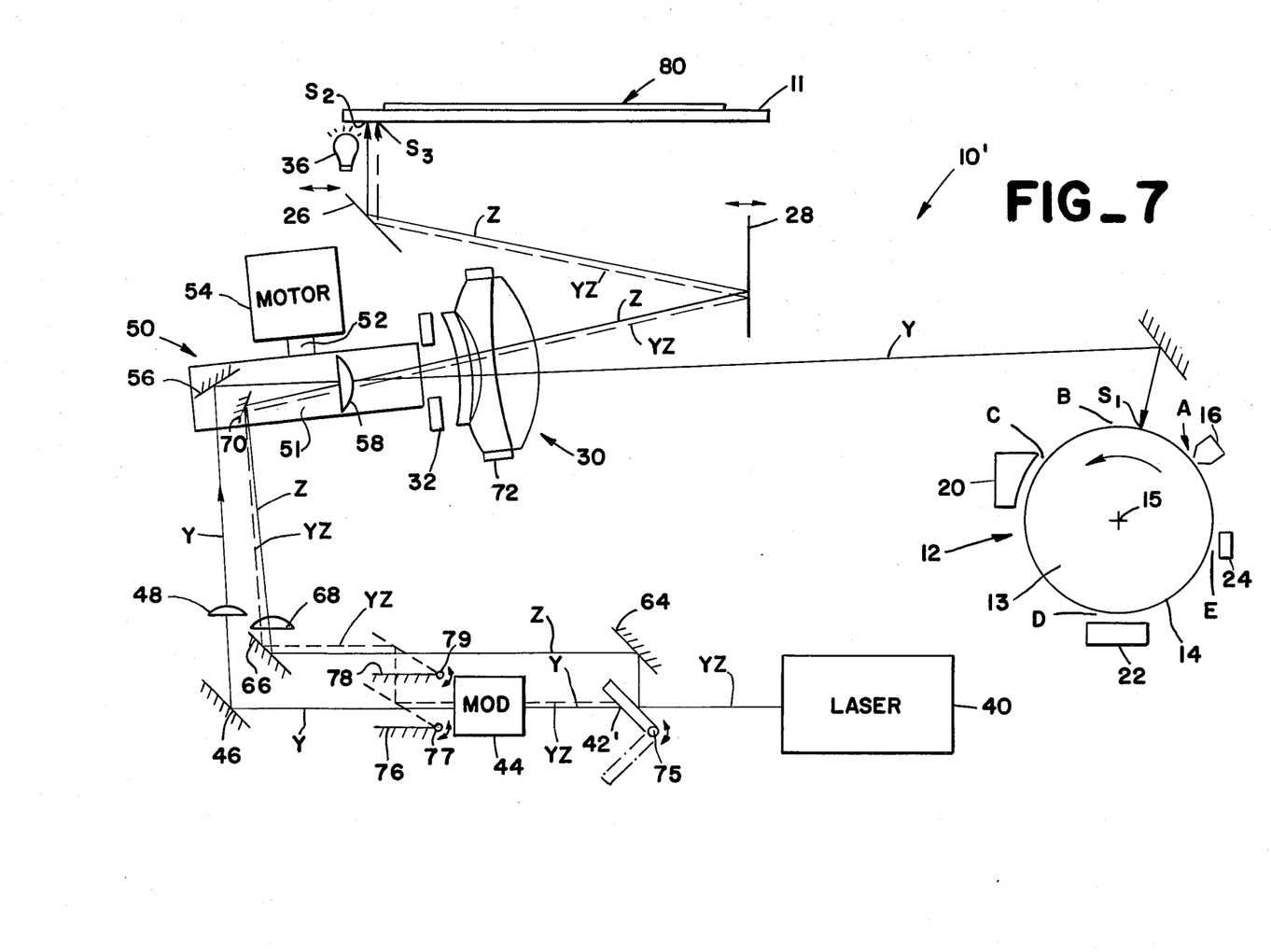
FIG. 7 is a schematic diagram of another optical data processor embodying the present invention.

Referring now to FIG. 7, it will be apparent that the present invention is readily extended to provide an optical data processor 10' which is also capable of selectively performing photographic and thermographic laser recording and of providing a luminescent readout display (referred to herein as luminescent recording). Indeed, the embodiment of FIG. 7 closely resembles the embodiment of FIG. 1 and, therefore, like reference numerals are employed to identify like parts.

Concentrating on the unique features of the optical data processor 10' shown in FIG. 7, it will be seen that the beam splitter 42' is pivotably mounted at 75 for movement into and out of the optical path between the laser 40 and the modulator 44. Furthermore, there are a pair of spaced apart mirrors 76 and 78 which are pivotably mounted at 77 and 79, respectively, for movement into and out of the optical path between the modulator 44 and the beam scanning mechanism 50. Preferably, the mirrors 76 and 78 are mechanically ganged (by means not shown) for simultaneous movement.

To carry out laser input scanning or laser xerographic printing, the beam splitter 42' is moved into its solid line position in the optical path between the laser 40 and the modulator 44 and the mirrors 76 and 78 are moved into their solid line positions (i.e, out of the optical path between the laser 40 and the beam scanning mechanism 50). Under these circumstances, the embodiment of FIG. 7 operates in the same manner as the embodiment of FIG. 1.

If, however, there is a call for laser photographic, thermograhic or luminescent recording, the beam splitter 42' is moved into its phantom line position (i.e., out of the optical path between the laser 40 and the modulator 44) and the mirrors 76 and 78 are moved into their phantom line positions in the optical path between the laser 40 and the beam scanning mechanism 50. Consequently, as indicated by the dashed lines, the laser output beam YZ is applied to the modulator 44 and the intensity modulated beam provided thereby is then serially reflected by the mirrors 76 and 78 to the fixed mirror 66. From there, the intensity modulated laser beam YZ follows essentially the same path as was previously described with reference to the unmodulated laser beam Z to provide a scanning spot $S_3$ for raster scanning a photographic, thermographic or luminescent recording medium 80 placed on the platen 11 in place of the aforementioned subject d (FIG. 1). In effect, the mirrors 76 and 78 selectively switch the modulator 44 from one to the other of the two optical paths to the beam scanning mechanism 50 to selectively provide an intensity modulated laser beam for projection toward the photoreceptor 14 for laser xerographic printing or toward the platen 11 for laser photograhic, thermographic or luminescent recording. The luminescent recording capability, of course, has the special advantage of providing a convenient output display for an operator to use in selecting prerecorded data for printing in more permanent form through the use of the laser xerographic, photographic or thermographic printing capability.

Figure 8:
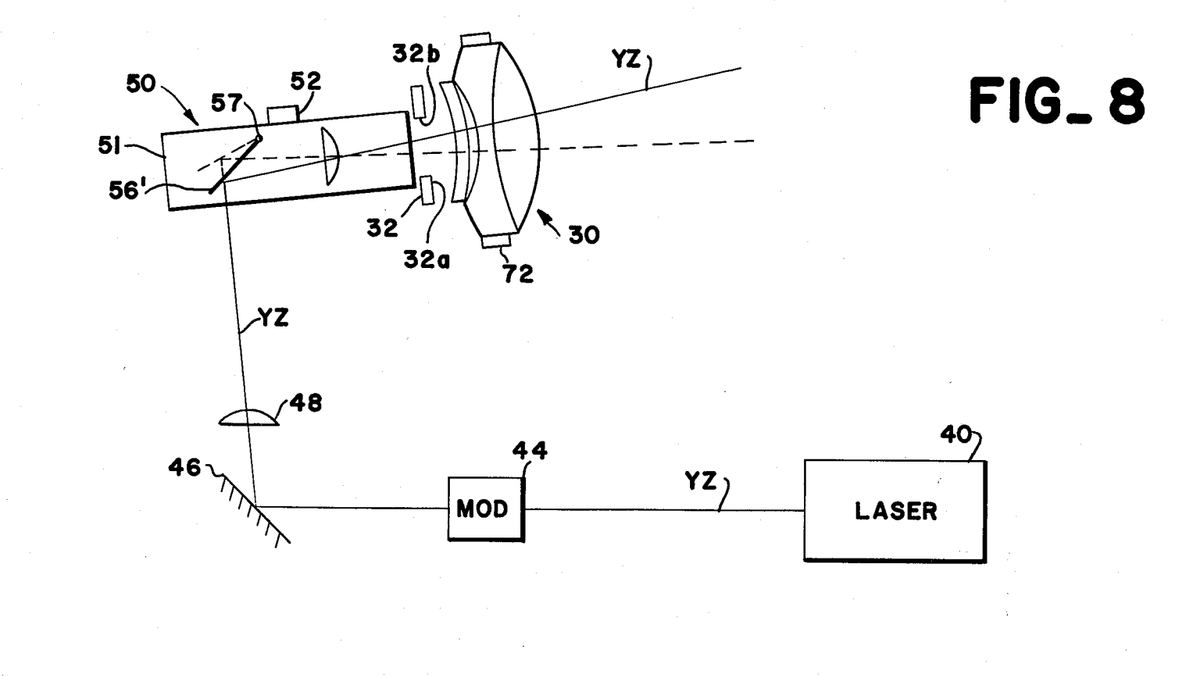
FIG. 8 is a schematic diagram of still another optical data processor constructed in accordance with this invention.

Turning to FIG. 8, there is a simplified optical data processor 10' which has all of the flexibility of the optical data processor 10' (FIG. 7), except for the capability to function as an electronic copier. In the embodiments of FIGS. 1 and 7, modulated and unmodulated laser beams Y and Z are simultaneously applied to the beam scanning mechanism 50 to simultaneously scan the photoreceptor 14 and the platen 11, respectively. As a result, electronic copying may be carried out by using the video signal generated by the photodector 72 to drive the modulator 44. There, of course, are applications in which the electronic data manipulation possibilities of electronic copying can be used to advantage, such as for editing and scaling purposes. Frequently, however, a light/lens copying capability is sufficient.

In that event, as shown in FIG. 8, the laser beam YZ may be fed through the modulator 44 to the fixed mirror 46 which, in turn, reflects the beam YZ to the singlet lens 48 for application to a mirror 56'. The mirror 56' is pivotably mounted at 57 to cause the beam scanning mechanism 50 to selectively project the beam YZ toward the platen 11 or toward the photoreceptor 14. Specifically, the mirror 56' is selectively moved into its solid line or its phantom line positions to vary the angle of incidence of the laser beam YZ on the beam scanning mechanism 50 so that the cyclically scanning laser beam YZ is selectively projected toward the platen 11 or the photoreceptor 14, respectively. A video drive signal is applied to the modulator 44 in the usual way to modulate the laser beam YZ whenever a laser writing function is being carried out. However, when a laser reading function is being performed, the modulator 44 is maintained in an "on" state by a suitable control signal so that beam YZ is applied to the beam scanning mechanism 50 in unmodulated form.

CONCLUSION

In view of the foregoing, it will now be understood that the present invention provides a compact and reliable multi-purpose optical data processor. The reliability of the optical data processor is attributable in large part to the use of a proven xerographic copier as the base for the multipurpose processor. The compactness is, on the other hand, due to the special provision which has been made for sharing the copier optics to carry out laser reading and writing in addition to ordinary light/lens xerographic copying.

It is believed that this invention is unique in providing a multipurpose optical data processor having shared optics for selectively performing light/lens xerograhic copying and laser scanning. However, the illustrated embodiments both have a laser reading and writing capability. In particular, one of those embodiments is capable of selectively performing light/lens xerograhic copying, laser input scanning, and laser xerograhic printing. The other embodiments are not only capable of performing those functions, but can also be used to selectively carry out laser photographic, thermographic or luminescent recording. In short, there are a variety of applications for the basic concept of this invention.

What is claimed is:

1. In a multi-purpose optical data processor for selectively performing light/lens xerographic copying and at least one laser scanning function, said optical data processor including a transparent platen for supporting a subject in position to be scanned;

a xerographic processor including a photoreceptor which advances during operation in a cross scan direction through an exposure station; and scan optics interposed between said platen and said exposure station for scanning said platen in said cross scan direction, said scan optics being elongated in an orthogonal line scanning direction to extend widthwise of said platen:

the improvement comprising a selectively energizeable light source for illuminating said platen during light/lens copying;

a selectively energizeable laser for supplying a laser beam during laser scanning;

a beam scanning mechanism optically aligned with said laser for cyclically sweeping said laser beam through a predetermined scan angle in said line scanning direction; and shared imaging optics including a half lens, said imaging optics being interposed between said scan optics and said exposure station for imaging said subject onto said photoreceptor in accordance with a line-by-line scanning pattern during light/lens copying and being optically aligned with said beam scanning mechanism for imaging said laser beam onto at least one of said platen and said photoreceptor in accordance with a raster scanning pattern during laser scanning.

2. The improvement of claim 1 wherein said laser beam is intensity modulated and is imaged onto said photoreceptor for laser xerographic printing.

3. The improvement of claim 1 wherein said laser beam is unmodulated and is imaged onto said platen for raster input scanning of said subject, and further including photodetector means positioned to intercept light reflected from said subject during raster input scanning for serially converting the reflected light into a corresponding electrical video signal.

4. The improvement of claim 1 wherein said laser beam comprises an intensity modulated component which is imaged onto said photoreceptor for laser xerographic printing and an unmodulated component which is imaged onto said platen for raster input scanning, and further including photodetector means positioned to intercept light reflected from said subject during raster input scanning for serially converting the reflected light into a corresponding electrical video signal.

5. The improvement of claim 1 wherein a recording medium is supported on said platen in place of said subject for laser recording, and said laser beam is intensity modulated and is imaged onto said platen for printing on said recording medium in accordance with said raster scanning pattern.

6. The improvement of claim 1 wherein
said half lens comprises a reflective rear surface having an optical aperture in front of and optically aligned with said beam scanning mechanism, whereby said half lens performs double pass imaging for light/lens copying and single pass imaging for laser scanning; and
said scan optics comprise constant conjugate scan optics optically aligned between said half lens and said platen for maintaining a substantially constant conjugate distance between said half lens and said platen while scanning said platen in said cross scan direction.

7. The improvement of claim 6 wherein said beam scanning mechanism is a holographic scanner having an f/number selected to generally collimate the cyclically sweeping laser beam projected therefrom.

8. The improvement of claim 6 further including
beam splitting means optically aligned between said laser and said beam scanning mechanism for dividing said laser beam into first and second secondary beams;
a pair of spaced apart optical paths extending from said beam splitting means to said beam scanning mechanism for applying said first and second beams, respectively, to said beam scanning mechanism at different angles of incidence, said angles of incidence being selected to cause said beam scanning mechanism to project said first and second beams through said half lens in projection planes optically aligned with said photoreceptor and said platen, respectively; and
modulator means disposed in the optical path for said first beam to intensity modulate said first beam for laser xerographic printing;
said second beam unmodulated for performing raster input scanning.

9. The improvement of claim 8 further including photodetector means positioned to intercept light reflected from said subject during raster input scanning, whereby the reflected light is serially converted into a corresponding video electrical signal.

10. The improvement of claim 9 wherein said beam scanning mechanism comprises a rotatable scan head having a plurality of substantially identical holographic facets mounted at regular angular intervals about its circumference to sequentially sweep said first and second beams through said scan angle, and each of said facets has an f/number selected to cause said first and second beams to be projected from said beam scanning mechanism in substantially collimated form.

11. The improvement of claim 10 wherein each of said facets has a generally symmetrical non-linear diffraction grating frequency gradient selected to cause said first and said second beams to generally linearly scan said photoreceptor and said platen, respectively, in said line scanning direction.

12. The improvement of claim 10 wherein said facets are mounted on said scan head in registration with apertures having contours selected to cause said first and said second beams to produce substantially constant intensity scanning spots on said photoreceptor and said platen, respectively.

13. The improvement of claim 12 wherein each of said facets has a generally symmetrical non-linear diffraction grating frequency gradient selected to cause said scanning spots to generally linearly scan said photoreceptor and said platen, respectively, in said line scanning direction.

14. The improvement of claim 8 further including means for selectively switching said modulator from one to the other of said optical paths; and wherein
a recording medium is supported on said platen in place of said subject for laser recording;
said beam splitting means is mounted for movement into and out of optical alignment between said laser and said modulator to divide said laser beam for laser xerographic printing and raster input scanning while permitting said laser beam to applied directly to said modulator for laser recording; and
said modulator is switched into one of said optical paths during laser xerograhic printing and raster input scanning to intensity modulate said first beam for projection toward said photoreceptor and into the other of said optical paths during laser recording to intensity modulate said laser beam for projection toward said platen.

15. The improvement of claim 14 wherein said means for selectively switching said modulator from one to the other of said optical paths comprises a pair of spaced apart mirrors which are mounted for movement into and out of optical alignment between said modulator and said beam scanning mechanism to optically switch said modulator into said other optical path and said one optical path, respectively.

16. The improvement of claim 14 wherein said beam scanning mechanism comprises a rotatable scan head having a plurality of substantially identical holographic facets mounted at regular angular intervals about its circumference in position to sequentially sweep the beams applied thereto via said one and said other of said optical paths through said predetermined scan angle, each of said facets having an f/number selected to substantially collimate said beams for application to said half lens.

17. The improvement of claim 16 wherein said facets are mounted on said scan head in registration with separate apertures having contours selected to cause said beams to be imaged as scanning spots which are of substantially constant intensity.

18. The improvement of claim 17 wherein each of said facets has a substantially symmetrical nonlinear diffraction grating frequency gradient selected to cause a substantially linear scan of said scanning spots in said line scanning direction.

19. The improvement of claim 18 wherein said means for selectively switching said modulator from one to the other of said optical paths comprises mirror means mounted for movement into and out of optical alignment between said modulator and said beam scanning mechanism to optically switch said modulator into said other optical path and said one optical path, respectively.

20. The multi-purpose optical data processor of claim 1 further including optical means interposed between said laser and said beam scanning mechanism, said laser beam being applied to said beam scanning mechanism with an angle of incidence controlled by said optical means, whereby said beam scanning mechanism projects said laser beam toward a selected one of said platen and said photoreceptor.

21. The multi-purpose optical data processor of claim 20 wherein said optical means comprises a movable mirror for altering said angle of incidence, whereby said laser beam is projected from said beam scanning mechanism to the selected one of said platen and said photoreceptor.

* * * * *